(12) United States Patent
Frye et al.

(10) Patent No.: US 9,736,669 B2
(45) Date of Patent: Aug. 15, 2017

(54) INTERFACE DEVICE FOR PROVIDING VEHICLE SERVICES USING A VEHICLE AND A MOBILE COMMUNICATIONS DEVICE

(71) Applicant: General Motors LLC, Detroit, MI (US)

(72) Inventors: Mark S. Frye, Grosse Pointe Woods, MI (US); Michael B. Ames, Lake Orion, MI (US); Derek Hopper, Fort Wayne, IN (US)

(73) Assignee: General Motors LLC, Detroit, MI (US)

( * ) Notice: Subject to any disclaimer, the term of this patent is extended or adjusted under 35 U.S.C. 154(b) by 325 days.

(21) Appl. No.: 13/793,007

(22) Filed: Mar. 11, 2013

(65) Prior Publication Data

US 2014/0256304 A1    Sep. 11, 2014

(51) Int. Cl.
    *H04W 4/00*    (2009.01)
    *H04W 4/20*    (2009.01)
    *H04W 4/04*    (2009.01)

(52) U.S. Cl.
    CPC ........... *H04W 4/206* (2013.01); *H04W 4/046* (2013.01)

(58) Field of Classification Search
    CPC ..................................................... H04W 4/001
    USPC ................................................................ 455/418
    See application file for complete search history.

(56) References Cited

U.S. PATENT DOCUMENTS

| | | | | |
|---|---|---|---|---|
| 2009/0289757 A1* | 11/2009 | Ballard | .......................... | 340/3.1 |
| 2011/0195699 A1* | 8/2011 | Tadayon et al. | ............... | 455/418 |
| 2011/0257973 A1* | 10/2011 | Chutorash et al. | ........... | 704/235 |
| 2013/0143546 A1* | 6/2013 | Ricci | .............................. | 455/420 |
| 2013/0157607 A1* | 6/2013 | Paek et al. | ................. | 455/404.1 |
| 2013/0190947 A1* | 7/2013 | Jang et al. | ......................... | 701/2 |
| 2014/0066014 A1* | 3/2014 | Nicholson et al. | ............ | 455/411 |

FOREIGN PATENT DOCUMENTS

WO    WO 2012010210    * 7/2010

* cited by examiner

*Primary Examiner* — Qun Shen
(74) *Attorney, Agent, or Firm* — Christopher DeVries; Reising Ethington P.C.

(57) ABSTRACT

A method and system for providing vehicle services using a vehicle and a mobile communications device includes receiving at a vehicle a wireless communication sent from an interface device physically attached to the mobile communications device; linking the interface device with one or more vehicle modules; and communicating between one or more vehicle modules and the mobile communications device via the interface device.

16 Claims, 3 Drawing Sheets

Figure 3

INTERFACE DEVICE FOR PROVIDING VEHICLE SERVICES USING A VEHICLE AND A MOBILE COMMUNICATIONS DEVICE

TECHNICAL FIELD

The present invention relates generally to mobile communications devices and more particularly to providing vehicle services with mobile communications devices using an interface device.

BACKGROUND OF THE INVENTION

In the past, access and control of a vehicle commonly called for mechanical key-lock interaction. That is, if a vehicle owner wanted to open vehicle doors or start the vehicle a key could be inserted into and engage a mechanical lock and the desired action could be accomplished. Presently, vehicle functions can be controlled (at least partially) using radio frequency (RF) signals that are generated by a hand-held "key fob." Using the key fob, the vehicle owner can press a button to unlock vehicle doors or trunks but use a mechanical key to start the vehicle. Or in another example, the key fob can operate without the mechanical key and wirelessly interact with the vehicle when the vehicle owner brings the key fob within a close proximity of the vehicle. Once the key fob is within close proximity, the vehicle can recognize the key fob and perform a number of actions, such as unlocking the doors/trunk and permitting the vehicle owner to start the vehicle. The key fob is usually delivered to the vehicle owner along with the vehicle by a vehicle dealer at the time of purchase.

Apart from key fobs that control vehicle function, vehicle owners often carry mobile communications devices, such as mobile phones or smartphones. These devices can place telephone calls, allow the user to connect to WiFi hotspots, or execute a number of other functions, such as downloading and storing small software applications that can be used at the mobile communications device. Vehicle owners often carry these devices together with key fobs and it can be helpful to facilitate interaction between the key fob and the mobile communications device.

SUMMARY OF THE INVENTION

According to an aspect of the invention, there is provided a method of providing vehicle services using a vehicle and a mobile communications device. The steps include receiving at a vehicle a wireless communication sent from an interface device physically attached to the mobile communications device; linking the interface device with one or more vehicle modules; and communicating between one or more vehicle modules and the mobile communicating device via the interface device.

According to another aspect of the invention, there is provided a method of providing vehicle services using a vehicle and a mobile communications device. The steps include pairing a mobile communications device with an interface device associated with the mobile communications device; linking the interface device with one or more vehicle modules; and communicating between one or more vehicle modules and the mobile communications device via the interface device.

According to yet another aspect of the invention, there is provided an interface device for use in wireless communication between a vehicle and a mobile communications device. The interface device includes a housing; and a wireless communication circuitry that enables the mobile communications device to communicate with the vehicle, wherein the interface device includes a processor and computer readable memory located within the housing, the memory being accessible by the processor stores computer readable instructions, wherein the processor operates upon execution of the instructions to (a) receive a request from the mobile communications device via an application residing in the mobile communications device, and (b) send this request to the vehicle.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method and system described below involves an interface device that connects with a mobile communications device and serves as a conduit for communicating commands and information between the vehicle and the mobile communications device. The interface device can be wirelessly paired with the mobile communications device to enable the mobile communications device to supplant the key fob and control one or more vehicle functions, such as vehicle ignition and door locking The interface device can be used to implement other vehicle functions at the mobile communications device as well, such as tire pressure monitoring. Regarding its form, the interface device can be designed to be unobtrusively combined with the mobile communications device so that the two devices look and feel like an integrated unit.

To provide an example of this, it is possible that the interface device is shaped to closely conform to the exterior contours of the mobile communications device such that the interface device envelops the mobile communications device. Apart from the shape of the interface device, it can also include hardware elements for wireless communication, such as an antenna, a processor, and/or a battery. As a result, the interface device can not only provide a communication conduit between the mobile communications device and the vehicle but it can also provide a protective shell for the mobile communications device. Working together, the mobile communications device/interface device can be paired with a particular vehicle such that the devices are recognized by the vehicle and authorized to command a number of vehicle services/functions. When the mobile communications device/interface device comes in close proximity with the vehicle, the mobile device or interface device can launch a software application that automatically initiates a vehicle service (e.g., unlocking the doors) or permits the vehicle owner to control the vehicle service via the mobile communications device.

Figure 1:
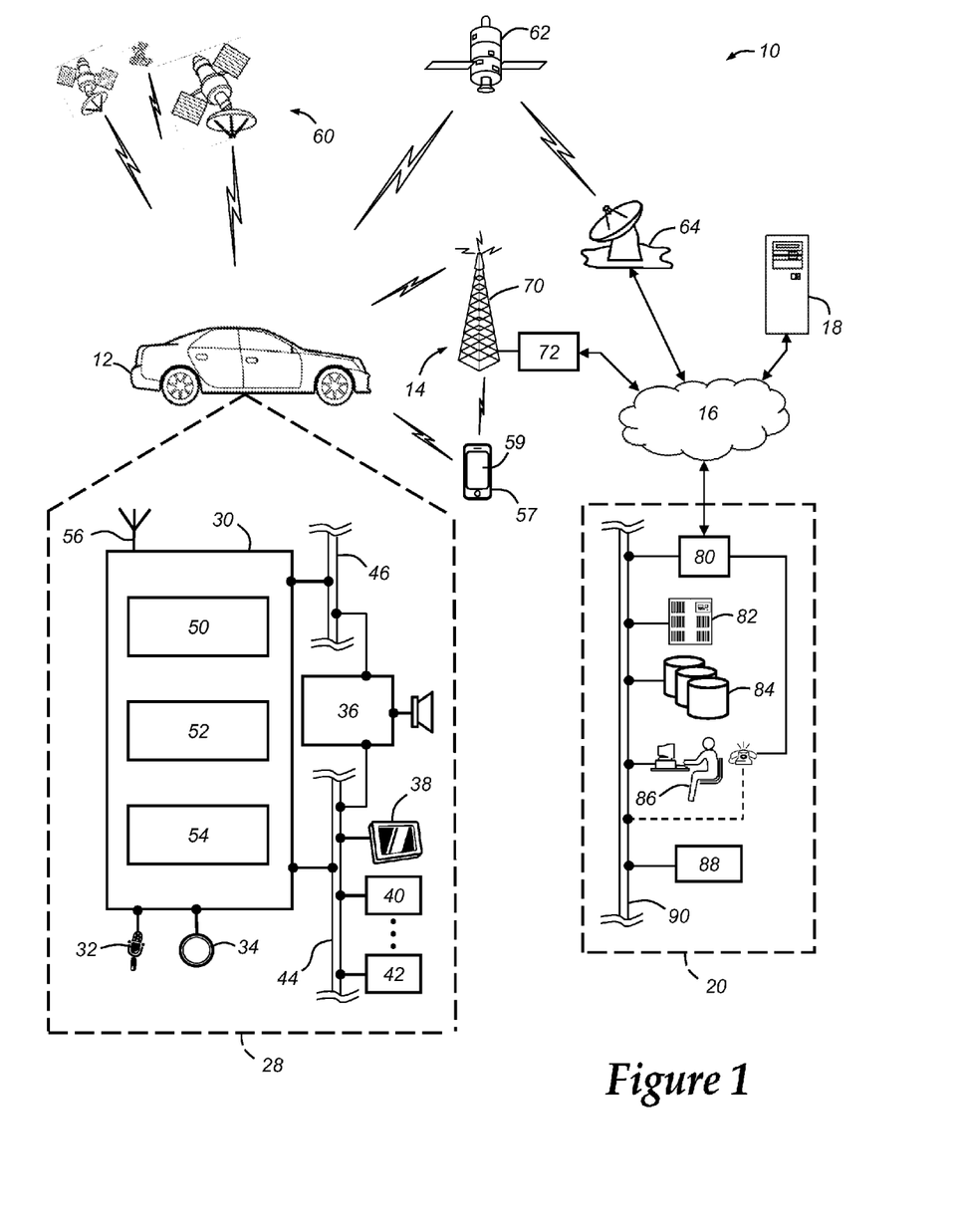
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 uses cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile communications device 57, such as a smartphone or other similar wireless device. The mobile communications device 57 can include computer processing capability, a transceiver capable of communicating using a short-range wireless protocol, and (optionally) a visual display 59. In some implementations, the mobile communications device 57 also includes a touch-screen graphical user interface and/or a GPS module capable of receiving GPS satellite signals and generating GPS coordinates based on those signals. Examples of the mobile communications device 57 include the iPhone™ manufactured by Apple, Inc. and mobile phones using the Android™ architecture manufactured by a number of producers, such as Motorola, Inc. While the mobile communications device 57 may include the ability to communicate via cellular communications using the wireless carrier system 14, this is not always the case. For instance, Apple manufactures devices such as the iPad™, iPad 2™, and the iPod Touch™ that include the processing capability, the display 59, and the ability to communicate over a short-range wireless communication link. However, the iPod Touch and some iPads do not have cellular communication capabilities. Even so, these and other similar devices may be used or considered a type of mobile communications device 57 for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be used either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
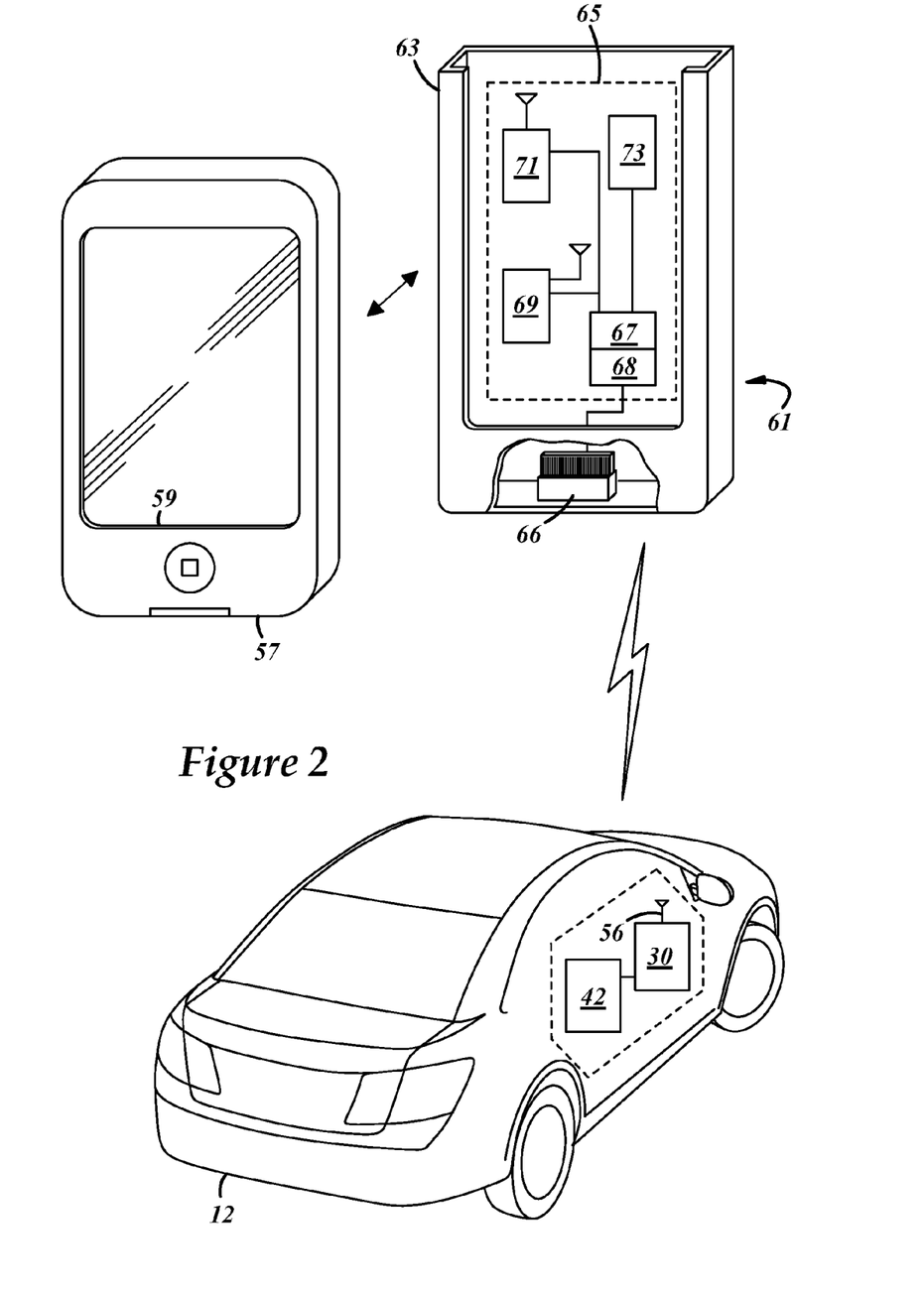
FIG. 2 is a block diagram depicting an exemplary embodiment of a system for providing vehicle services via an interface unit using a vehicle and a mobile communications device.

Turning now to FIG. 2, there is shown an exemplary implementation of an interface device 61 for use between the vehicle 12 and the mobile communications device 57. The interface device 61 includes a rigid or flexible housing 63 and wireless communication circuitry 65 that enables the mobile communications device 57 to communicate with the vehicle 12. It is envisioned that the housing 63 can be formed from an elastomeric material within which the wireless communication circuitry 65 can be embedded. When constructed in this way, the housing 63 can be physically joined with the mobile communications device 57 such that the housing 63 fits over the device 57 to at least partially envelop or surround the device. This construction can result in a housing 63 having a skin-like fit over the mobile communications device 57. In that way, the housing 63 can be flexible and expand slightly as the mobile communications device 57 and the interface device 61 are mated. However, it should be appreciated that this skin-like implementation is not necessary and that the interface device 61 can take the form of a dongle or other plug-in device adapted to communicate with the mobile communications device 57.

As part of the mating process, a connector interface 66 of the interface device 61 can be placed in communication with a corresponding receptacle of the mobile communications device 57. For example, many mobile communications devices 57, such as smartphones, use female-type receptacles located on the housing of these devices 57. These female-type receptacles permit the exchange of data between the mobile communications device 57 and outside devices. In one example, the female-type receptacle can be a 30-pin dock connector. Similarly, the connector interface 66 feature of the interface device 61 can be a male-type connector adapted to fit and operate with the female-type receptacle of the mobile communications device 57. The connection between the connector interface 66 of the interface device 61 and the mobile communications device 57 can facilitate the communication of data between devices 57 and 61. Other connector interface configurations can be used, such as the lightning connector used on recent iPhones. It may also be possible to provide power from the interface device 61 to the mobile communications device 57 via the connector interface 66 or from the mobile communications device 57 to the interface device 61.

The wireless communication circuitry 65 of the interface device 61 can include a processor 67 and computer readable memory 68 located within the housing 63. The memory 68 can be accessed by the processor 67 and store computer readable instructions. These instructions can be executed upon receipt of a request from the mobile communications device 57 via an application residing in the mobile communications device 57 and the request can be sent to the vehicle 12. The processor 67 can communicate with one or more software modules, such as a key authentication module 69 and/or a tire pressure monitoring system (TPMS) module 71, as part of commanding the vehicle 12 to unlock/lock doors/trunks and/or obtain data from the vehicle 12 that can be used to display vehicle information at the mobile communications device 57, such as tire pressure information. The mobile communications device 57 can wirelessly communicate with the vehicle 12 through the interface device 61. These communications (e.g., commands or wireless messages) can be received by the vehicle 12 at the antenna 56 using the vehicle telematics unit 30. It is also possible that one or more VSMs 42, such as a door lock module or a module responsible for monitoring tire pressure at the vehicle 12 can each have their own antenna and the interface device 61 can communicate directly with each VSM 42.

Figure 3:
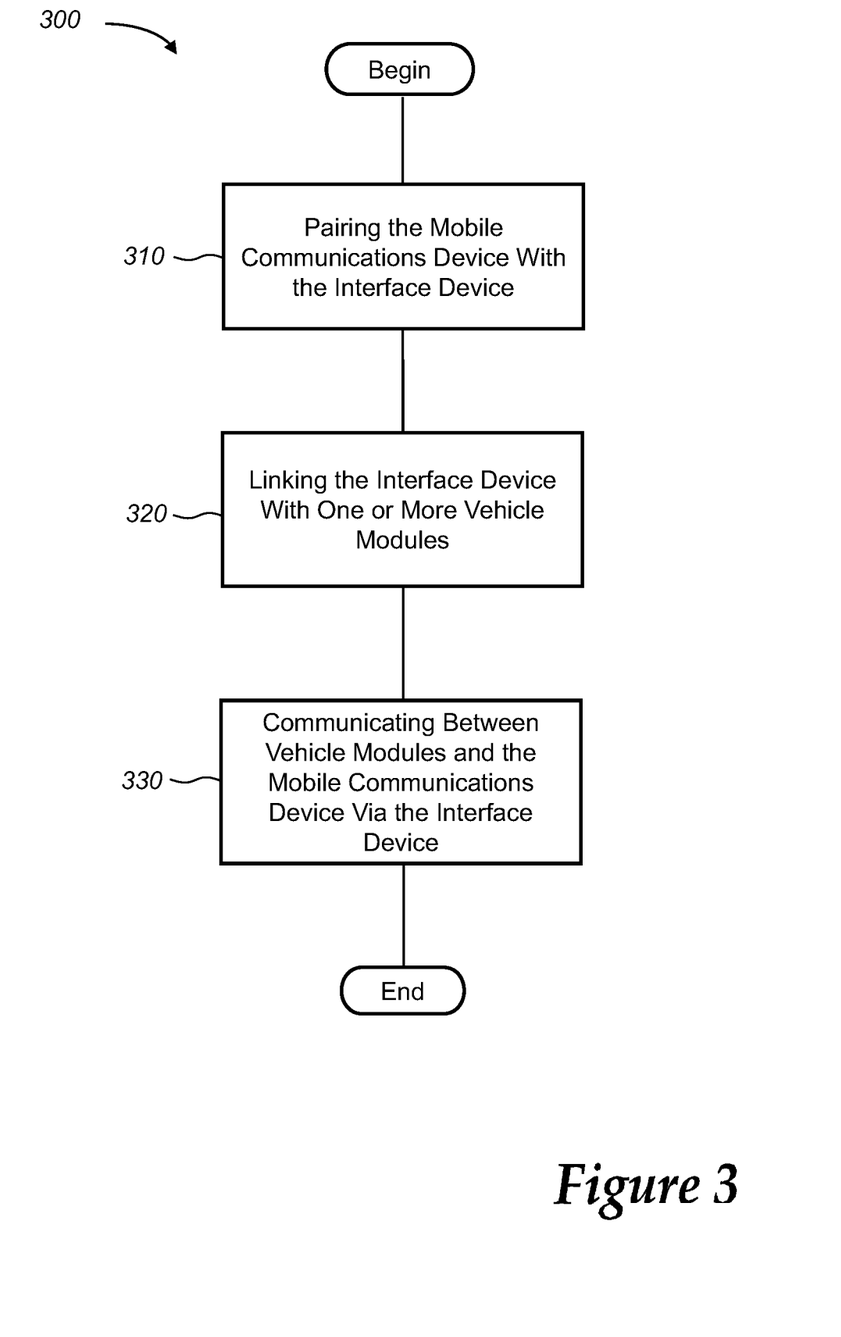
FIG. 3 is a flow chart depicting a method of providing vehicle services using a vehicle, a mobile communications device, and an interface unit.

Turning to FIG. 3, there is shown a method 300 of providing vehicle services using the vehicle 12 and the mobile communications device 57. The method 300 begins at step 310 by pairing the mobile communications device 57 with the interface device 61 associated with the mobile communications device 57. The act of pairing can mean to physically pair (e.g., physically attaching the mobile communications device 57 to the interface device 61) and/or to wirelessly pair (e.g., setting up the mobile communications device 57 and interface device 61 to operate with the vehicle 12). The wireless aspect of linking can be carried out by receiving at the vehicle 12 a wireless communication sent from the interface device 61. The wireless communication can include information identifying the user (e.g., vehicle owner) of the mobile communications device 57 to the vehicle 12. For example, a vehicle identifier, such as a vehicle identification number (VIN), an electronic serial number (ESN), or other similar ID, can be sent from the interface device 61 to the vehicle 12. This can let the vehicle 12 know that the mobile communications device 57 and/or the interface device 61 is authorized to communicate with the vehicle 12. The vehicle identifier can be obtained in a variety of ways. For example it can be entered by the vehicle owner into the mobile communications device 57, it can be flashed/stored into the interface device 61, or it can be obtained as part of a software application (or "App") resident on the mobile communications device 57 or interface device 61. It is also possible to provide the vehicle identifier at a vehicle dealership, which could store the vehicle identifier on the interface device 61 as part of delivery of the vehicle 12 to the vehicle owner.

The wireless communication can alert the vehicle 12 that a vehicle owner using the interface device 61 is attempting to pair the device 61 (or mobile communications device 57 combined with the device 61) with the vehicle 12 such that the device 61 can execute key fob-like commands to the vehicle 12. It is possible that the mobile communications device 57 (or optionally the interface device 61) can determine that the device 57 is within a predetermined range of the vehicle 12 and begin pairing the device 61 with the vehicle 12 automatically based on that proximity. The proximity of the mobile communications device 57 to the vehicle 12 can be determined in a variety of ways, such as by detecting a short-range wireless signal transmitted by the vehicle 12 or using the GPS capabilities of the mobile communications device 57. Once the vehicle 12 receives the vehicle identifier, the vehicle 12 can determine if the identifier is valid. If so, the mobile communications device 57/interface device 61 can be paired with the vehicle 12 such that the vehicle 12 recognizes the mobile communications device 57/interface device 61 in the future. It is also possible to pair the mobile communications device 57 to the interface device 61 using a Bluetooth protocol. The method 300 proceeds to step 320.

At step 320, the interface device 61 is linked with one or more VSMs 42. Once the mobile communications device 57 and the interface device 61 are paired with the vehicle 12 and they come within the predetermined range of the vehicle 12, an application residing in the mobile communications device 57 can be automatically initiated or executed. This step can be carried out in a variety of ways. For instance, the mobile communications device 57 can determine that the device 57 and the interface device 61 are within the predetermined distance from the vehicle 12 and launch an App resident on the mobile communications device 57 that initiates communication between the mobile communications device 57 and the vehicle 12 through the interface device 61. It is also possible that when the mobile communications device 57 comes within the predetermined range of the vehicle 12 or detects a signal transmitted by the vehicle 12 the App can then be downloaded from a central software server using the mobile communications device 57.

The App stored at the mobile communications device 57 or the interface device 61 can generate a graphical user interface (GUI) that is shown on the display 59 of the mobile communications device 57. The GUI can offer the user (e.g., a vehicle owner) an option to configure the mobile communications device 57/interface device 61 for each vehicle function that can be controlled at the device 57. For instance, the user can be offered a number of vehicle functions via the GUI shown on the display 59 and the user can select one or more of these functions he wishes to enable at the mobile communications device 57. In one example, the GUI can display a "setup" button on the display 59 and by selecting this button the user can choose to set up vehicle unlocking/locking, vehicle ignition, and tire pressure monitoring, to name a few of many examples of vehicle functions. This will be discussed in more detail below.

In response to the user selecting one or more vehicle functions, at least one identifier associated with one vehicle module can be sent from the vehicle 12 to the mobile communications device 57 via the interface device 61 and stored at the mobile communications device 57, the interface device 61, or both. That is, an identifier can be sent for each VSM 42 to be controlled by the mobile communications device 57 and/or the interface device 61. For instance, if the user sets up the mobile communications device 57/interface device 61 to unlock doors and monitor tire pressure, the vehicle 12 can send vehicle module identifiers for the vehicle modules responsible for door locking/unlocking/vehicle ignition (e.g., the body control module) and the vehicle module responsible for tire pressure monitoring. These identifiers can be encrypted by pairs of symmetrical or asymmetrical encryption keys that enable information to be passed securely from the mobile communications device 57 to the vehicle 12 via the interface device 61.

VSMs 42 used as part of the method 300 can be of various types and may carry out one or more vehicle functions at the vehicle 12. For instance, the VSM 42 can include a climate control module, alarm module, window lifter module, exterior or interior lighting module, and/or any module that communicates with a vehicle control module. It is possible vehicle modules and/or vehicle control modules to communicate with each other via a vehicle bus. The method 300 proceeds to step 330.

At step 330, communication between one or more vehicle modules 42 and the mobile communications device 57 via the interface device 61 begins. Once the mobile communications device 57/interface device 61 is setup and the user or vehicle owner carries the mobile communications device 57/interface device 61 toward the vehicle 12, the interface device 61 can establish a wireless link between the mobile communications device 57 and the vehicle 12. The vehicle 12 can receive a command or request sent from the mobile communications device 57 via the interface device 61 that is intended to control some vehicle function. For example, as the mobile communications device 57 approaches the vehicle 12, the device 57 may be setup to unlock vehicle doors and start the engine. The mobile communications device 57 can communicate the appropriate identifier to the vehicle 12, such as a VIN and/or a vehicle module identifier associated with the vehicle function to be controlled via the interface device 61. Once received, the vehicle 12 can validate the request to unlock vehicle doors and start the engine. In one example, the identifier (e.g., the VIN or vehicle module identifier) can be compared to a list of identifiers stored at the vehicle 12. If the identifier received from the mobile communications device 57 via the interface device 61 matches one or more of those stored at the vehicle 12, then the command is verified and the vehicle 12 carries out the command (e.g., unlocks the doors and starts the engine); otherwise, the command is ignored or denied.

In one implementation, the mobile communications device 57 can generate a GUI on the display 59 having tiered menus for controlling vehicle functions. The App that is discussed above and used by the mobile communications device 57 can display a single button on the display 59 for accessing the App that controls the vehicle 12. Once selected, a second menu can be displayed (i.e., a second tier). The second menu can offer the user one or more vehicle functions to be monitored as well as the "setup" button. Choosing one of the buttons from the second menu can allow the user to access specific actions or commands for each of the vehicle functions displayed on the second menu. For example, the first menu can include a button labeled "my car." Selection of the "my car" button can then cause the display of a plurality of other buttons on the second menu, such as "my tire pressure" and "my key." If the user were to select "my key," this could cause a third menu to appear on the display 59 that offered buttons for "unlock," "lock," "trunk," or other functions. Selection of these buttons could initiate the communication of corresponding actions/commands to the vehicle 12 to be carried out using the method 300 described above. The method 300 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing vehicle services using a vehicle and a mobile communications device, comprising the steps of:
   (a) receiving at a vehicle a wireless communication sent from an interface device physically attached to the mobile communications device, wherein the interface device comprises a housing shaped to closely conform to exterior contours of the mobile communications device so that the housing forms a protective shell around the mobile communications device, and wherein the interface device is physically joined with the mobile communications device in a mating engagement that creates a combined integrated unit that is carried by a vehicle user;
   (b) linking the interface device with one or more vehicle modules;
   (c) determining that the combined integrated unit is within a predetermined distance from the vehicle;
   (d) automatically establishing a communication session between the combined integrated unit and the vehicle via an application residing in the mobile communications device when the combined integrated unit is within the predetermined distance from the vehicle; and
   (e) communicating between one or more vehicle modules and the mobile communicating device contained in the combined integrated unit.

2. The method of claim 1, wherein the vehicle module is one of a list that comprises a tire pressure monitoring system, key or vehicle access authentication module, climate control module, alarm module, window lifter module, exterior or interior lighting module, or any module that communicates with a vehicle control module.

3. The method of claim 2, wherein the vehicle module and the vehicle control module communicate with each other via a vehicle bus.

4. The method of claim 1, wherein step (a) further comprises pairing the mobile communications device to the interface device using a Bluetooth connection.

5. The method of claim 1, wherein the method further comprises the steps of: sending at least one identifier associated with one vehicle module from the vehicle to the mobile communications device, storing the identifier at the mobile communications device, interface device, or both, obtaining the identifier from the mobile communications device, interface device, or both at the vehicle, comparing the identifier with an identifier stored at the vehicle.

6. The method of claim 1, wherein step (b) further comprises:
   (b1) establishing a wireless link between the mobile communications device and the vehicle via the interface device;
   (b2) receiving a request at the vehicle from the mobile communications device for an identifier associated with the vehicle;
   (b3) validating the request from the mobile communications device;
   (b4) sending a vehicle identifier to the mobile communications device; and
   (b5) programming the mobile communications device with the identifier.

7. A method of communication between a vehicle and a mobile communications device, comprising the steps of:
   (a) pairing a mobile communications device with an interface device associated with the mobile communications device, wherein the interface device comprises a housing shaped to closely conform to exterior contours of the mobile communications device so that the housing forms a protective shell around of the mobile communications device, and wherein the interface device is physically joined with the mobile communications device in a mating engagement that creates a combined integrated unit that is carried by a vehicle user;
   (b) linking the interface device with one or more vehicle modules;
   (c) automatically initiating a communication session with the combined integrated unit via an application residing in the mobile communications device when the combined integrated unit is within a predetermined distance from the vehicle; and (d) communicating between one or more vehicle modules and the mobile communications device contained in the combined integrated unit.

8. The method of claim 7, wherein the vehicle module is one of a list that comprises a tire pressure monitoring system, key or vehicle access authentication module, climate control module, alarm module, window lifter module, exterior or interior lighting module, or any module that communicates with a vehicle control module.

9. The method of claim 7, wherein step (a) further comprises pairing the mobile communications device to the interface device using a Bluetooth connection.

10. The method of claim 7, wherein the method further comprises, the steps of: sending at least one identifier associated with one vehicle module from the vehicle to the mobile communications device, storing the identifier at the mobile communications device, interface device, or both, obtaining the identifier from the mobile communications device, interface device, or both at the vehicle, comparing the identifier with an identifier stored at the vehicle.

11. The method of claim 7, wherein step (a) further comprises:

(a1) powering up a mobile communications device and running an application residing in the mobile communications device; and (a2) pairing the mobile communications device with an interface device enveloping the mobile communications device.

12. The method of claim 7, further comprising the steps of:

sending at least one identifier associated with one vehicle module to the vehicle via the mobile communications device; and determining that the mobile communications device has been configured for communications with one or more vehicle modules via the interface device.

13. An interface device for use in wireless communication between a vehicle and a mobile communications device, comprising:

a housing shaped to closely conform to exterior contours of the mobile communications device so that the housing forms a protective shell around of the mobile communications device, and wherein the interface device is physically joined with the mobile communications device in a mating engagement that creates a combined integrated unit that is carried by a vehicle user; and a wireless communication circuitry embedded within the housing that enables the combined integrated unit to communicate with the vehicle;

wherein the wireless communication circuitry includes a processor and computer readable memory located within the housing, the memory being accessible by the processor stores computer readable instructions, wherein the processor operates upon execution of the instructions to (a) receive a request from the mobile communications device via an application residing in the mobile communications device, (b) send this request to the vehicle; and (c) automatically initiate communication with the vehicle via the application when the combined integrated unit is within a predetermined distance from the vehicle.

14. The interface device of claim 13, wherein the mobile communications device is a mobile phone and the housing is a skin device enveloping the mobile phone.

15. The interface device of claim 13, wherein the interface device receives power externally from the mobile communications device or the mobile communications device receives power externally from the interface device.

16. The interface device of claim 13, wherein the interface device further comprises an internal battery that powers up the interface device.

* * * * *